US012650043B2

(12) United States Patent
Tofall

(10) Patent No.: US 12,650,043 B2
(45) **Date of Patent: *Jun. 9, 2026**

(54) ITEM OF FURNITURE

(71) Applicant: Hettich-ONI GmbH & Co. KG, Vlotho (DE)

(72) Inventor: Ralf Tofall, Bückeburg (DE)

(73) Assignee: Hettich-ONI GmbH & Co. KG, Vlotho (DE)

( * ) Notice: Subject to any disclaimer, the term of this patent is extended or adjusted under 35 U.S.C. 154(b) by 61 days.

This patent is subject to a terminal disclaimer.

(21) Appl. No.: 18/729,928

(22) PCT Filed: Jan. 10, 2023

(86) PCT No.: PCT/EP2023/050387
§ 371 (c)(1),
(2) Date: Jul. 18, 2024

(87) PCT Pub. No.: WO2023/138944
PCT Pub. Date: Jul. 27, 2023

(65) Prior Publication Data

US 2025/0116143 A1 Apr. 10, 2025

(30) Foreign Application Priority Data

Jan. 21, 2022 (DE) ..................... 10 2022 101 400.2

(51) Int. Cl.
*E05D 11/06* (2006.01)
*E05D 3/06* (2006.01)

(52) U.S. Cl.
CPC ................ *E05D 11/06* (2013.01); *E05D 3/06* (2013.01); *E05Y 2900/20* (2013.01)

(58) Field of Classification Search
CPC ....... E05D 11/06; E05D 3/06; E05Y 2600/12; E05Y 2900/20
See application file for complete search history.

(56) References Cited

U.S. PATENT DOCUMENTS 5,035,026 A 7/1991 Carlo et al.
7,478,891 B2 1/2009 Hollenstein
(Continued)

FOREIGN PATENT DOCUMENTS

DE 296 16 978 U1 11/1996
DE 203 07 958 U1 9/2003
(Continued)

OTHER PUBLICATIONS

International Search Report in PCT/EP2023/050383, mailed Apr. 21, 2023.
(Continued)

*Primary Examiner* — Matthew W Ing
(74) *Attorney, Agent, or Firm* — Collard & Roe, P.C.

(57) ABSTRACT

A piece of furniture includes a furniture body with an upper floor and a flap, and at least one flap fitting being arranged on the upper floor in order to hold the flap movably between a position closing a storage space of the furniture body and an opening position. The flap fitting includes a housing, on which a support arm is rotatably mounted, which includes a retaining element for fixing the flap, and an energy store, by means of which a force can be applied to the support arm, the support arm being articulatedly connected to a drive lever, which is articulatedly connected to a deflection lever. An opening limiter is provided between the drive lever and the deflection lever, by means of which the maximum opening position of the support arm can be adjusted. This allows the flap fitting to be flexibly adapted to the respective installation position.

14 Claims, 18 Drawing Sheets

(56) References Cited

U.S. PATENT DOCUMENTS

Figure 1:
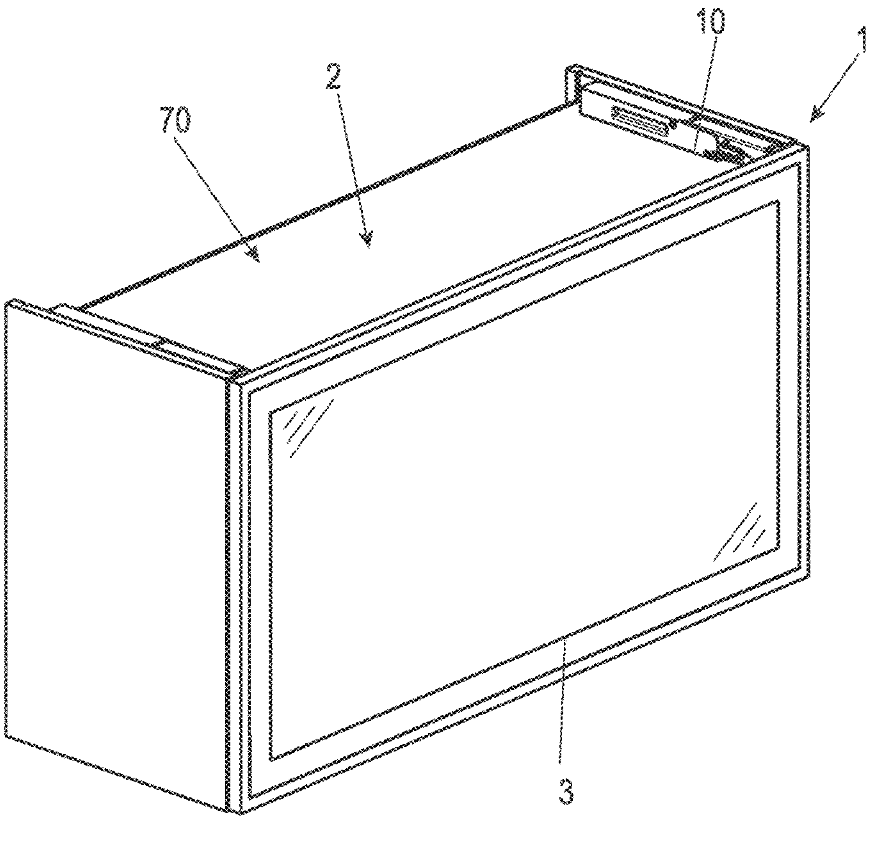

| | | | |
|---|---|---|---|
| 7,497,532 | B2 | 3/2009 | Salice |
| 10,352,081 | B2 | 7/2019 | Hirtsiefer et al. |
| 10,968,672 | B2 | 4/2021 | Schmid |
| 11,008,793 | B2 | 5/2021 | Güzeltepe et al. |
| 2001/0039762 | A1 | 11/2001 | Giovanetti |
| 2007/0124893 | A1 | 6/2007 | Brustle |
| 2008/0238276 | A1 | 10/2008 | Migli |
| 2010/0162847 | A1 | 7/2010 | Gassner |
| 2012/0084944 | A1 | 4/2012 | Hirtsiefer |
| 2012/0161598 | A1 | 6/2012 | Blum |
| 2016/0333620 | A1 | 11/2016 | Holzapfel |
| 2017/0241176 | A1 | 8/2017 | Zetti |
| 2018/0291665 | A1 | 10/2018 | Güzeltepe |
| 2018/0363349 | A1 | 12/2018 | Kuramochi |
| 2019/0093404 | A1 | 3/2019 | Schmid |
| 2019/0242167 | A1 | 8/2019 | Salice |
| 2019/0316396 | A1 * | 10/2019 | Kruedener .............. F16B 12/50 |
| 2020/0224477 | A1 | 7/2020 | Sobolewski et al. |
| 2021/0010311 | A1 | 1/2021 | Nordieker et al. |
| 2021/0404230 | A1 | 12/2021 | Giovannetti |
| 2022/0018174 | A1 | 1/2022 | Güzeltepe et al. |
| 2022/0056747 | A1 | 2/2022 | Holzapfel |
| 2022/0251890 | A1 | 8/2022 | Hirtsiefer |
| 2022/0259909 | A1 | 8/2022 | Hirtsiefer |
| 2023/0383584 | A1 | 11/2023 | Schneider et al. |
| 2024/0279971 | A1 | 8/2024 | Zetti |

FOREIGN PATENT DOCUMENTS

| | | | | |
|---|---|---|---|---|
| DE | 20 2005 021 984 | U1 | 2/2012 | |
| DE | 10 2011 082 171 | A1 | 3/2013 | |
| DE | 20 2011 109 550 | U1 | 3/2013 | |
| DE | 10 2014 113 970 | A1 | 3/2016 | |
| DE | 10 2019 113 338 | A1 | 11/2020 | |
| EP | 1837471 | A2 | 9/2007 | |
| EP | 2 607 590 | A2 | 6/2013 | |
| EP | 2622159 | A1 | 8/2013 | |
| EP | 1 934 421 | B1 | 9/2015 | |
| EP | 2949852 | A1 | 12/2015 | |
| JP | 2006-299533 | A | 11/2006 | |
| WO | 2017/059982 | A1 | 4/2017 | |
| WO | 2017/219055 | A1 | 12/2017 | |
| WO | WO-2020112058 | A2 * | 6/2020 | ................ E05F 3/20 |

OTHER PUBLICATIONS

German Search Report dated Apr. 4, 2024 in German Application No. 10 2022 101 398.7, with English translation.
International Search Report in PCT/EP2023/050386, mailed Apr. 24, 2023.
German Search Report dated Sep. 28, 2022 in German Application No. 10 2022 101 401.0, with English translation.
International Search Report in PCT/EP2023/050387, mailed Mar. 27, 2023.
German Search Report dated Apr. 4, 2024 in German Application No. 10 2022 101 400.2, with English translation.

* cited by examiner

ITEM OF FURNITURE

CROSS REFERENCE TO RELATED APPLICATIONS

This application is the National Stage of PCT/EP2023/050387 filed on Jan. 10, 2023, which claims priority under 35 U.S.C. § 119 of German Application No. 10 2022 101 400.2 filed on Jan. 21, 2022, the disclosure of which is incorporated by reference. The international application under PCT article 21(2) was not published in English.

The present invention relates to a piece of furniture having a furniture body with an upper floor and a flap, wherein at least one flap fitting is arranged on the upper floor in order to hold the flap movably between a position closing a storage space of the furniture body and an opening position, wherein the flap fitting comprises a housing on which a support arm is rotatably mounted, which includes a retaining element for fixing the flap, and comprises an energy store by means of which a force can be applied to the support arm, the support arm being articulatedly connected to a drive lever which is articulatedly connected to a deflection lever.

For pivoting flaps, it is known from US 2008/0238276 to provide a pivot fitting with a rotatably mounted support arm, which on the one hand is rotatably mounted on the furniture body and is connected to the flap at the free end. The support arm is pretensioned in the opening direction by a spring in order to counteract the weight of the flap. As the flap is held pivotable upwards, it may be necessary, depending on the installation position, to adjust the position of the flap higher or lower in the maximum opening position in order to ensure easy handling for the user.

It is therefore the problem to be solved by the present invention to create a piece of furniture with a flap fitting that enables improved adaptation to the installation position of a flap.

This problem is solved by a piece of furniture with the features of claim 1.

In the piece of furniture according to the invention, an opening limiter is provided between the drive lever and the deflection lever, by means of which the maximum opening position of the support arm can be adjusted. This prevents the flap from being arranged too high when it is lifted to the maximum opening position that would make it difficult for the user to grip. In addition, the maximum opening position can be adapted to the respective installation position.

Preferably, the opening limiter includes an adjustment element that is adjustable relative to the tension lever and the deflection lever and interacts with a stop. The opening limiter and a stop can move relative to the pivoting support arm and the flap during the pivoting movement of the flap. The adjustment element can be arranged in a connecting portion between the drive lever and the deflection lever, which enables a compact design. In the closing position of the support arm, it can embrace the drive lever and the deflection lever in a U-shaped manner. The deflection lever is preferably rotatable on the housing, with the axis of rotation of the deflection lever arranged at a distance from the axis of rotation of the support arm.

For stepless adjustment, the adjustment element can include a threaded element in order to be adjusted by a rotary movement in the longitudinal direction. The threaded element can be designed as a threaded pin, threaded sleeve or as a molded part with a thread.

In a further embodiment, the opening limiter can be formed as a rotatable lever. For a compact design, the opening limiter can be rotatable about an axle about which the drive lever and the deflection lever are also rotatably connected.

Optionally, a damper, in particular a linear damper, can be provided on the opening limiter, which can be actuated when the support arm moves in the opening direction shortly before reaching the maximum opening position. The damper can be preloaded into an extended position by a spring, so that the damper automatically moves back into an initial position when the flap fitting is closed.

For easy adjustment, the opening angle limiter can comprise a tool receptable for adjusting the opening angle of the flap.

The retaining element for fixing the flap is preferably arranged at the free end on the support arm. The retaining element can comprise a latching mechanism for fixing the flap for tool-free assembly.

Preferably, the support arm is connected to a drive lever, which in turn is articulated to a deflection lever. The articulation of the drive lever can be provided in a central portion of the support arm, preferably in a range between 25% and 75% of the length of the support arm.

The energy store is preferably connected to the deflection lever via a connection that can be adjusted in position, so that the effect of the energy store can be changed by adjusting the connection. By adjusting the connection, the working stroke of the energy store and the effect of the energy store can be changed depending on the position of the support arm. This allows increased flexibility in the adjustment of the energy store, which enables better adaptation to the weight of the flap.

Preferably, the connection is held on an adjustment means via which the position of the connection relative to the deflection lever can be adjusted in order to change the point at which the energy store applies force. The energy store acts on the deflection lever via the connection, so that the effective lever length can be changed via the distance between the axis of rotation and the connection.

The adjustment means for the connection preferably includes a linear guide, although alternatively a curve guide or a pivoting lever can also be provided to change the position of the connection. If a linear guide is inserted, a rotatable spindle can be provided, for example, which can be adjusted by simple means and enables a compact design. Other linear guides can also be used, for example a toothed rack or latching mechanism with different mounting positions.

Preferably, the adjustment means forms a unit with the deflection lever, which is articulated to the drive lever on the one hand and articulated to the housing on the other. As a result, the connection remains essentially adjacent to the housing, as the drive lever covers a greater distance via the support arm. The adjustment means can be fixed to the deflection lever or can be mounted rotatable around the two axes together with the deflection lever.

In a further embodiment, the energy store is coupled to the adjustable connection via a lever. This allows the energy store to be guided essentially linearly, while a connection between the connection and the energy store is established via the lever or a pulling element.

To avoid hard impact noise, a damper is preferably provided, via which a movement of the support arm in the closing direction can be braked shortly before reaching the closing position. This damper can optionally also be used for opening damping, whereby an actuating element for moving the damper is preferably provided for this purpose, which can be used to brake the support arm when the support arm moves in the opening direction shortly before reaching the maximum opening position. This damper can, for example, be formed as a linear damper, in particular as a fluid damper, which is preloaded into an extended position by a spring. This allows the damper to be automatically moved to an initial position after actuation.

The energy store preferably includes at least one spring, which is formed in particular as a compression spring and is held with one end on a housing and with an opposite end on a spring holder. A pulling element can be fixed to the spring holder. This allows the flap fitting to be formed particularly compactly and can provide high forces. For example, two to six springs can be arranged parallel to each other between the housing and the spring holder. The springs can be guided on pins to ensure linear movement. However, other energy stores can also be used, for example with tension springs or other spring elements.

The piece of furniture can be formed as a wall unit in a kitchen, for example. Preferably, the furniture body is equipped with an upper floor, with at least one flap fitting arranged above the top side. Preferably, the flap is held on several flap fittings, in particular on opposite sides. The flap fitting can be arranged to lie concealed on the upper floor, for example if the side walls are raised at least to the height of the flap fitting. The flap fitting can be attached to the raised side walls and/or to the upper floor.

Preferably, the opening limiter is adjustable so that a lower edge of the flap is below the bottom side of the upper floor in a maximum opening position, with a smallest adjustable opening angle. At a maximum adjustable opening angle, the lower edge of the flap can be arranged in a maximum opening position above the bottom side of the upper floor. A lower edge of the flap can be adjustable in height by at least 5 cm, for example.

Preferably, the opening limiter is movable via a tool receptable and the tool receptable is only accessible in an open setting of the flap. The tool receptable can then be accessible from the front or from the side for an adjustment process in the open position of the support arm in relation to the piece of furniture.

In a further embodiment, the depth, side, height and/or inclination of the flap can be adjustable. The adjusting device can be provided on the housing of the flap fitting and or on the fastening interface between the retaining element and the flap. Eccentrics, worm gears, slotted holes and/or molded parts with threads or screws can be used here as adjusting means for setting the relative position in a spatial direction of the flap to the piece of furniture.

Figure 2:
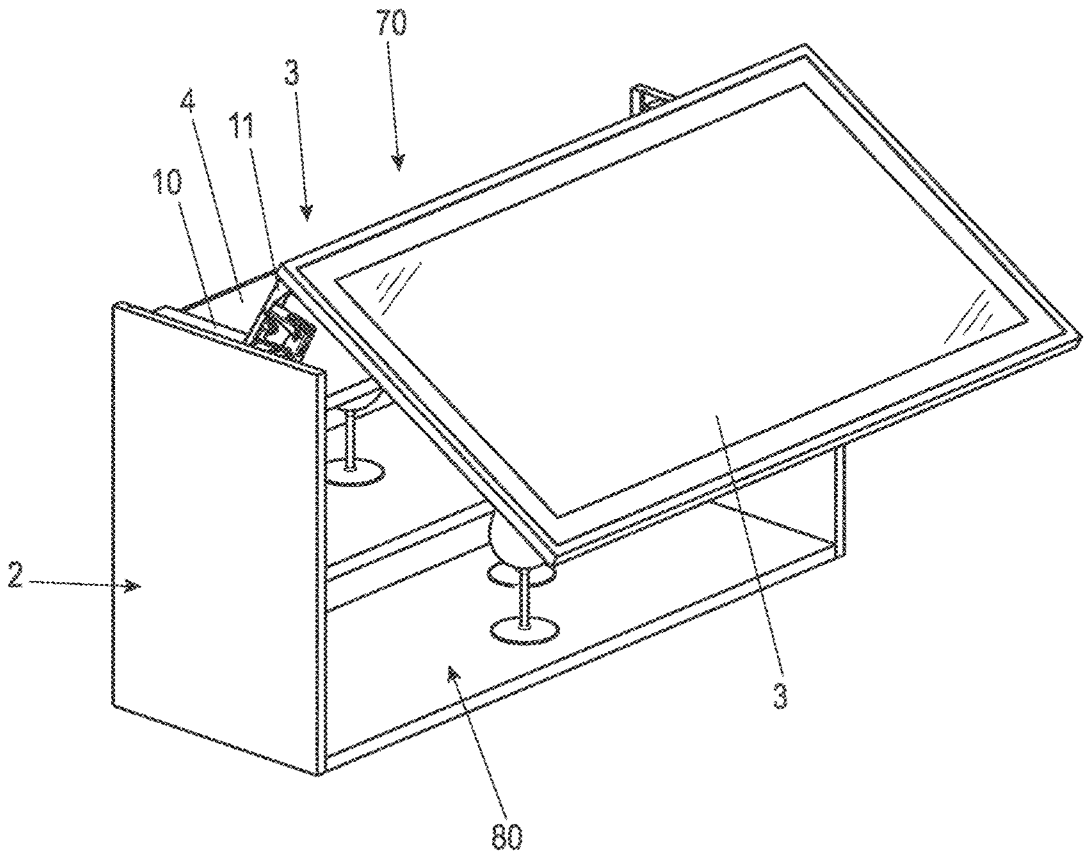
Figure 3B:
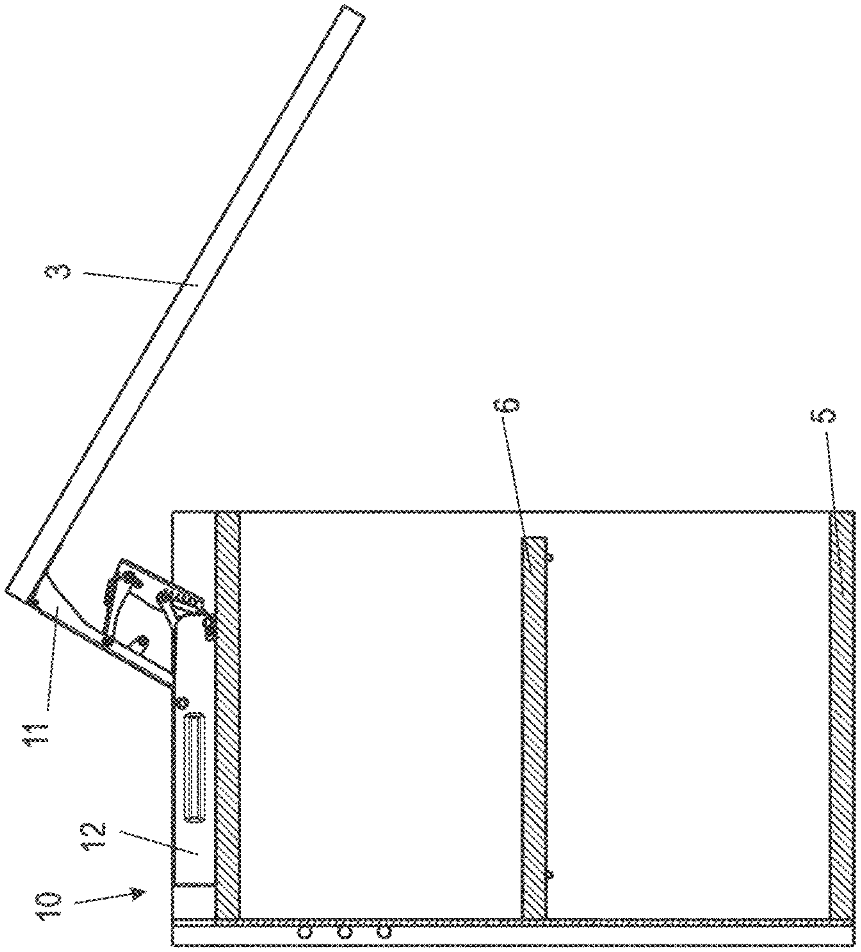
Figure 3A:
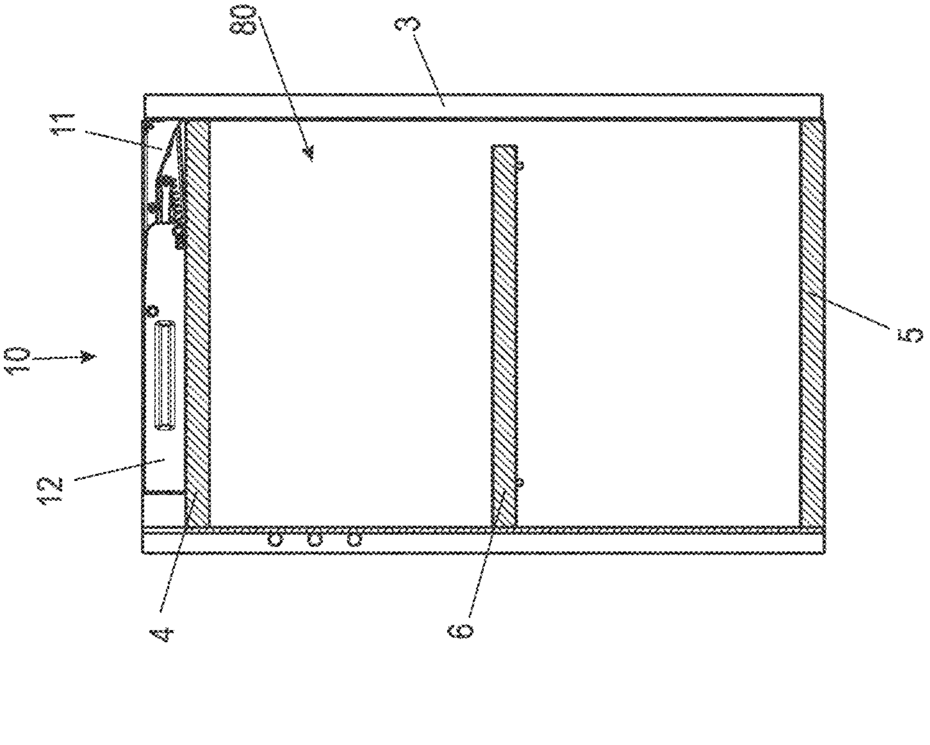
Figure 3C:
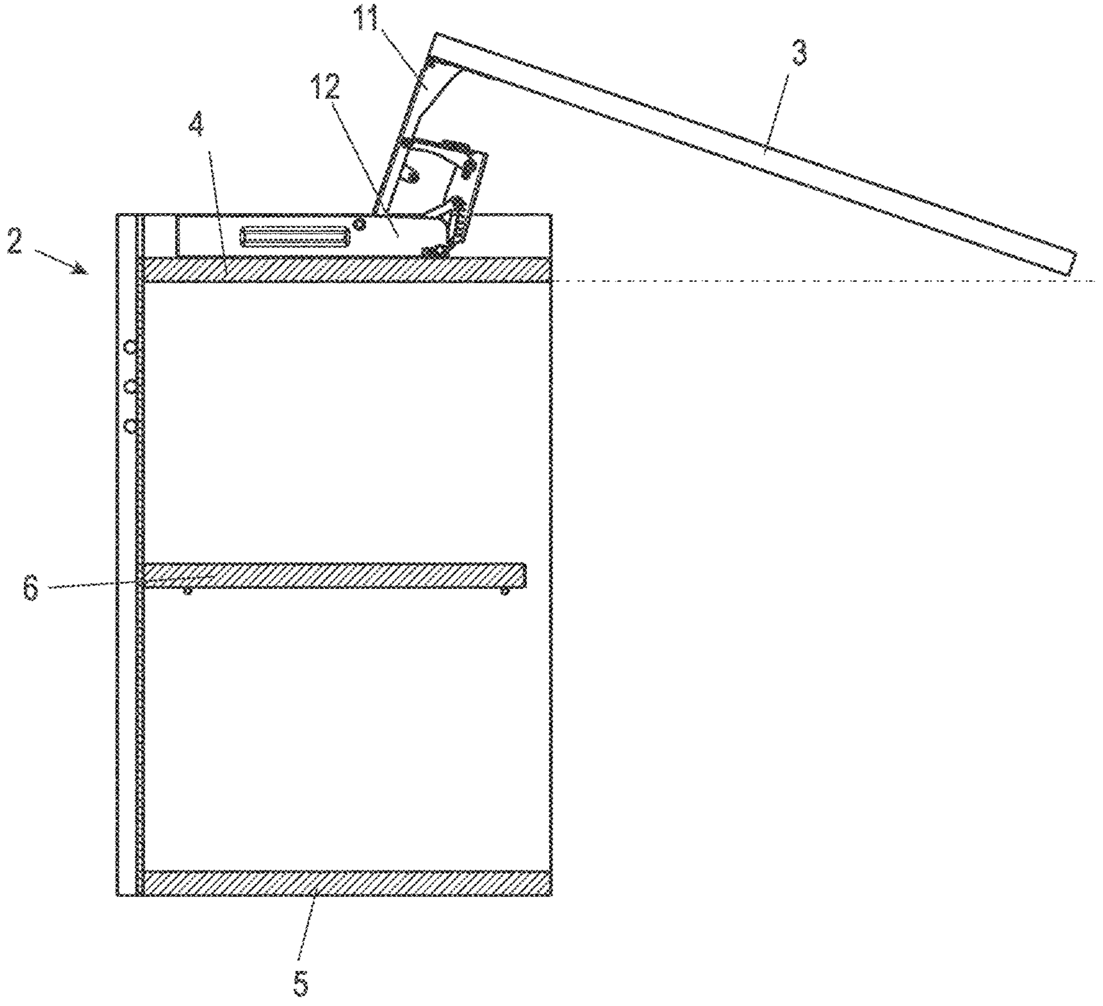
Figure 4:
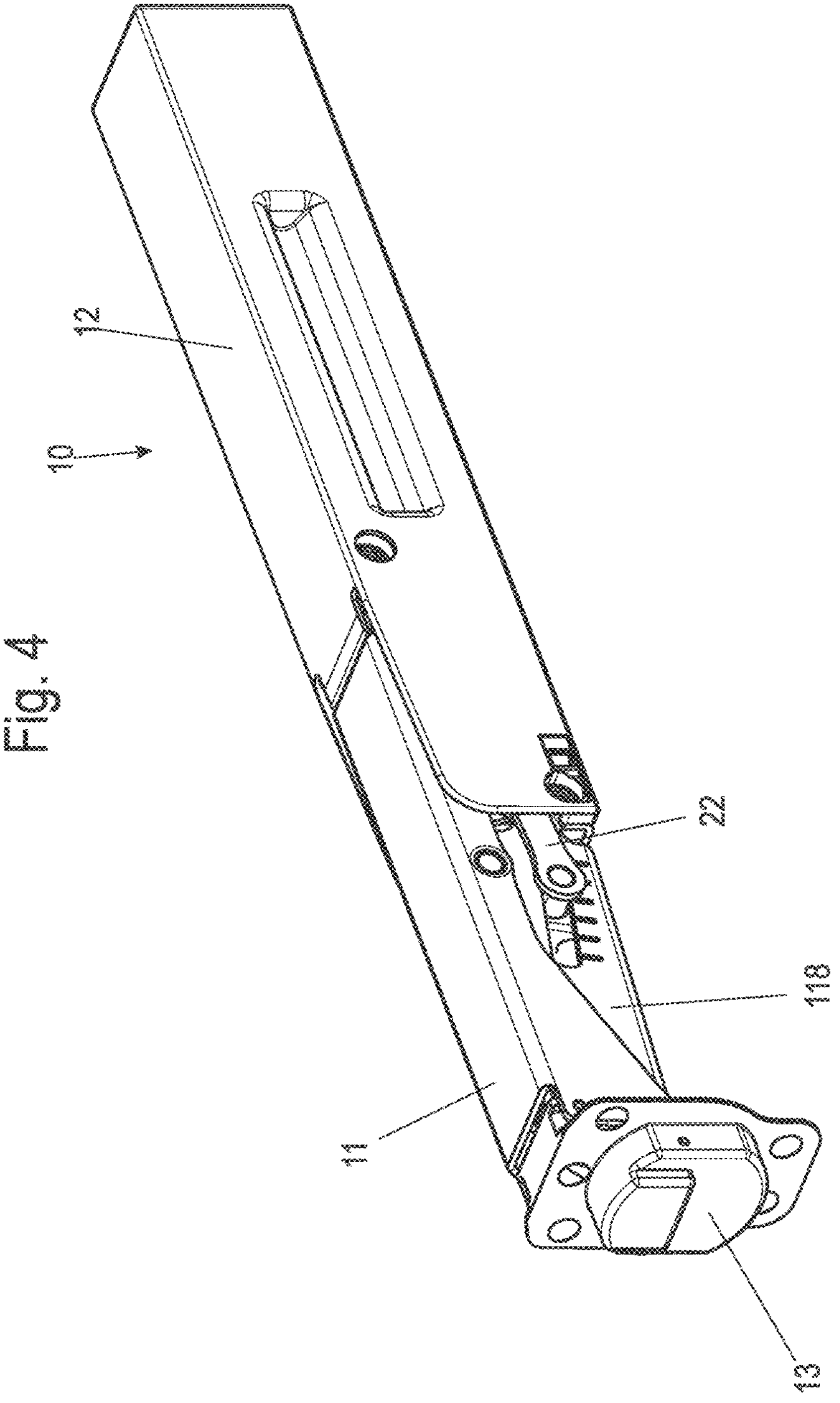
Figure 5:
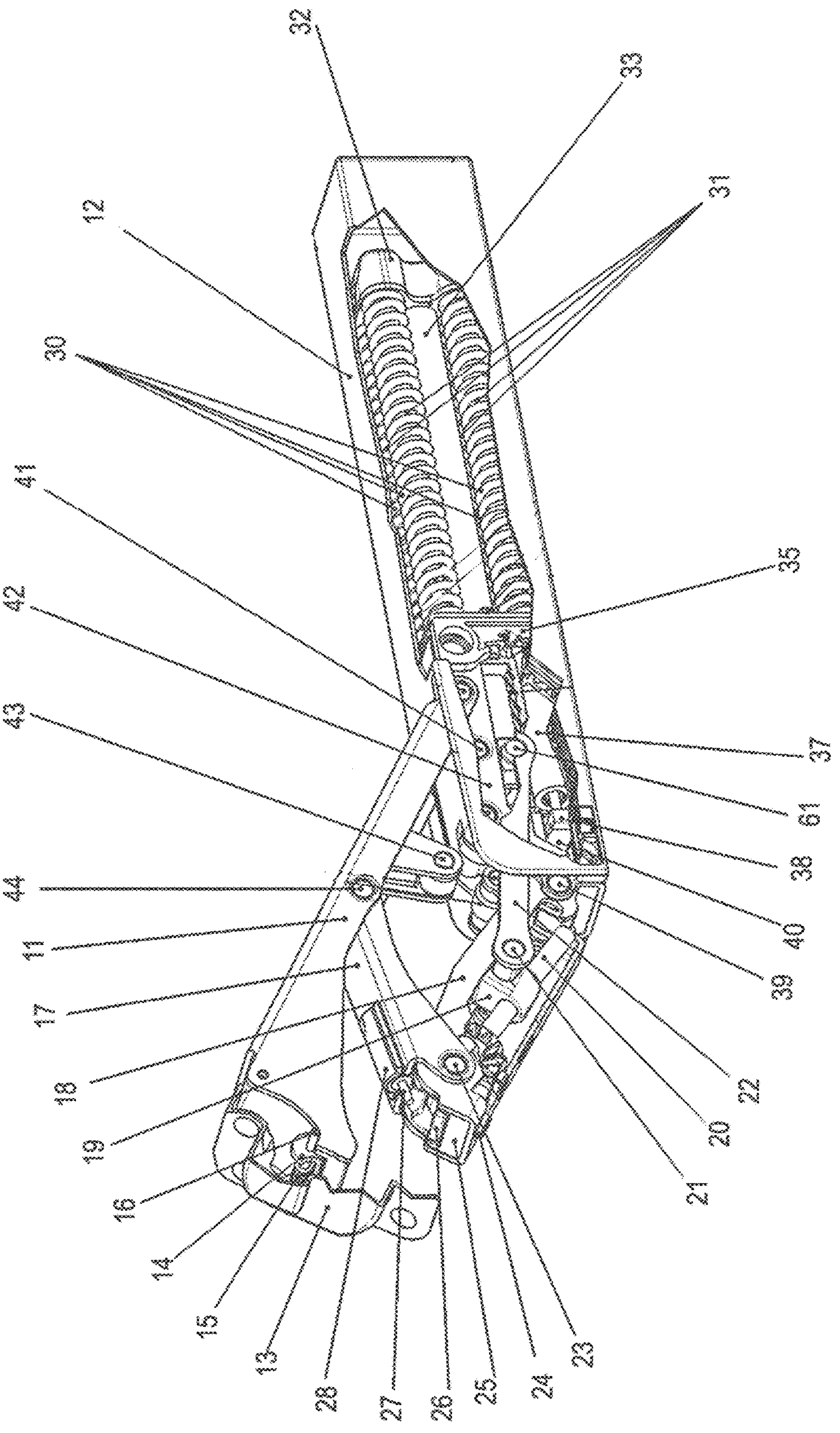
Figure 6:
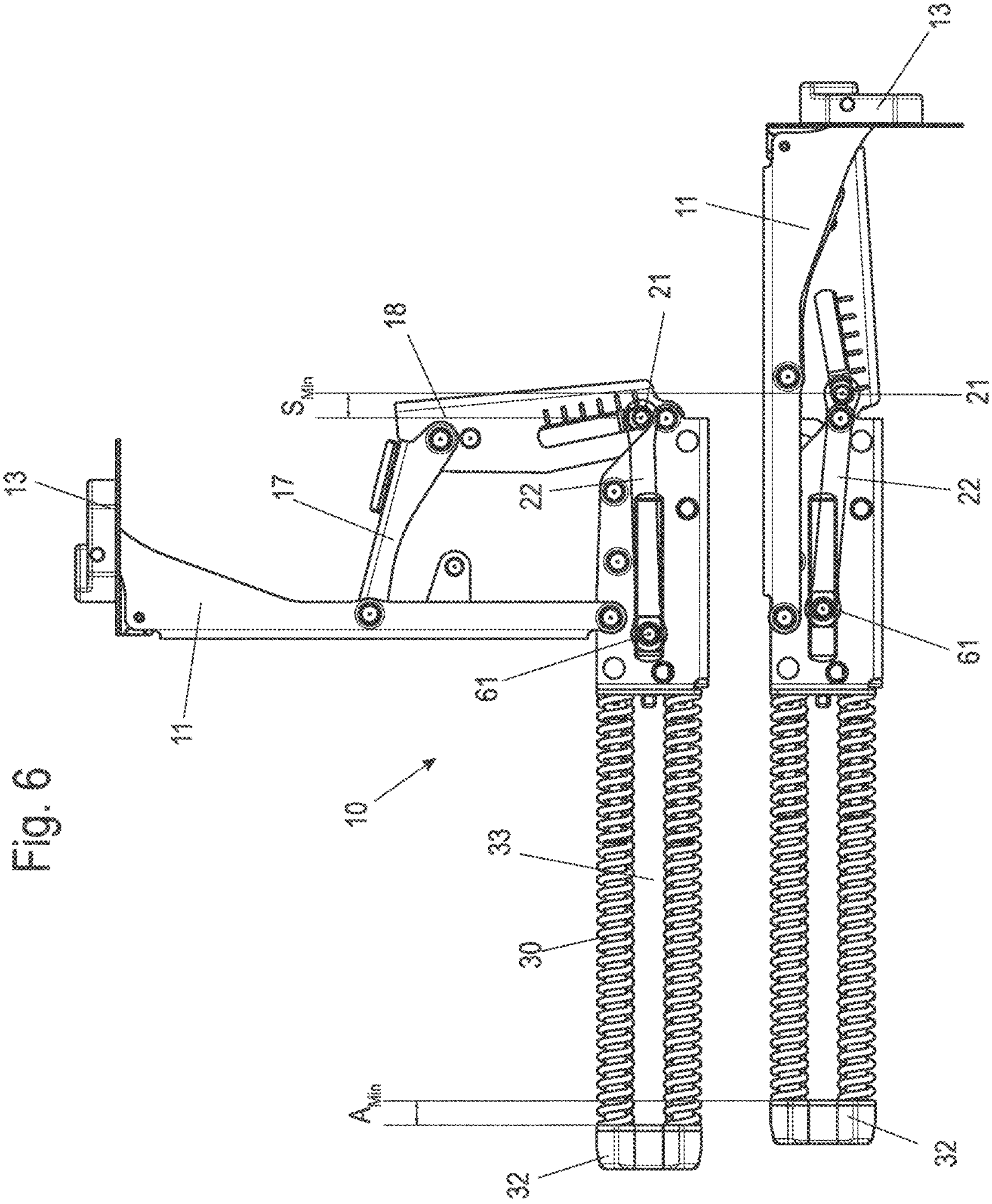
Figure 7:
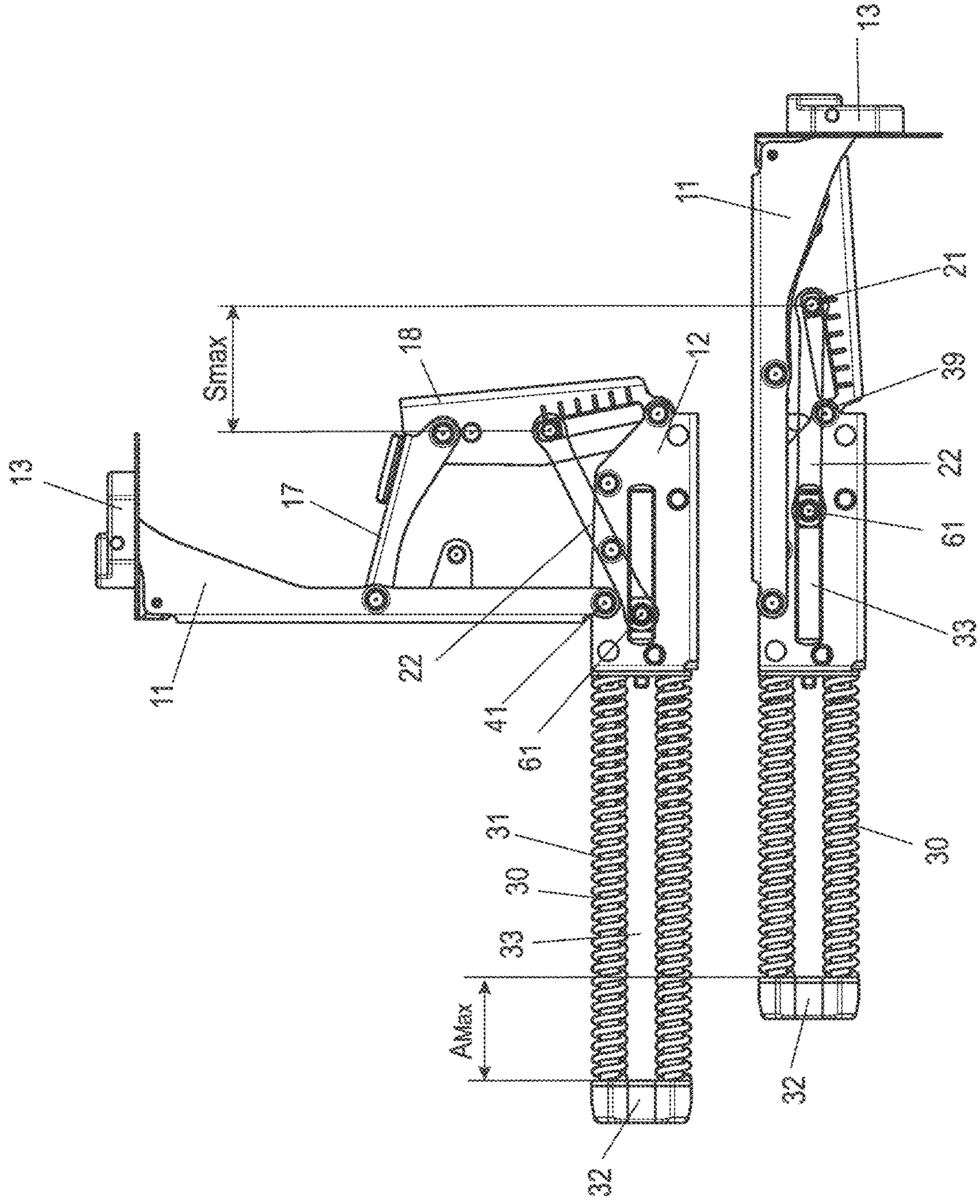
Figure 8:
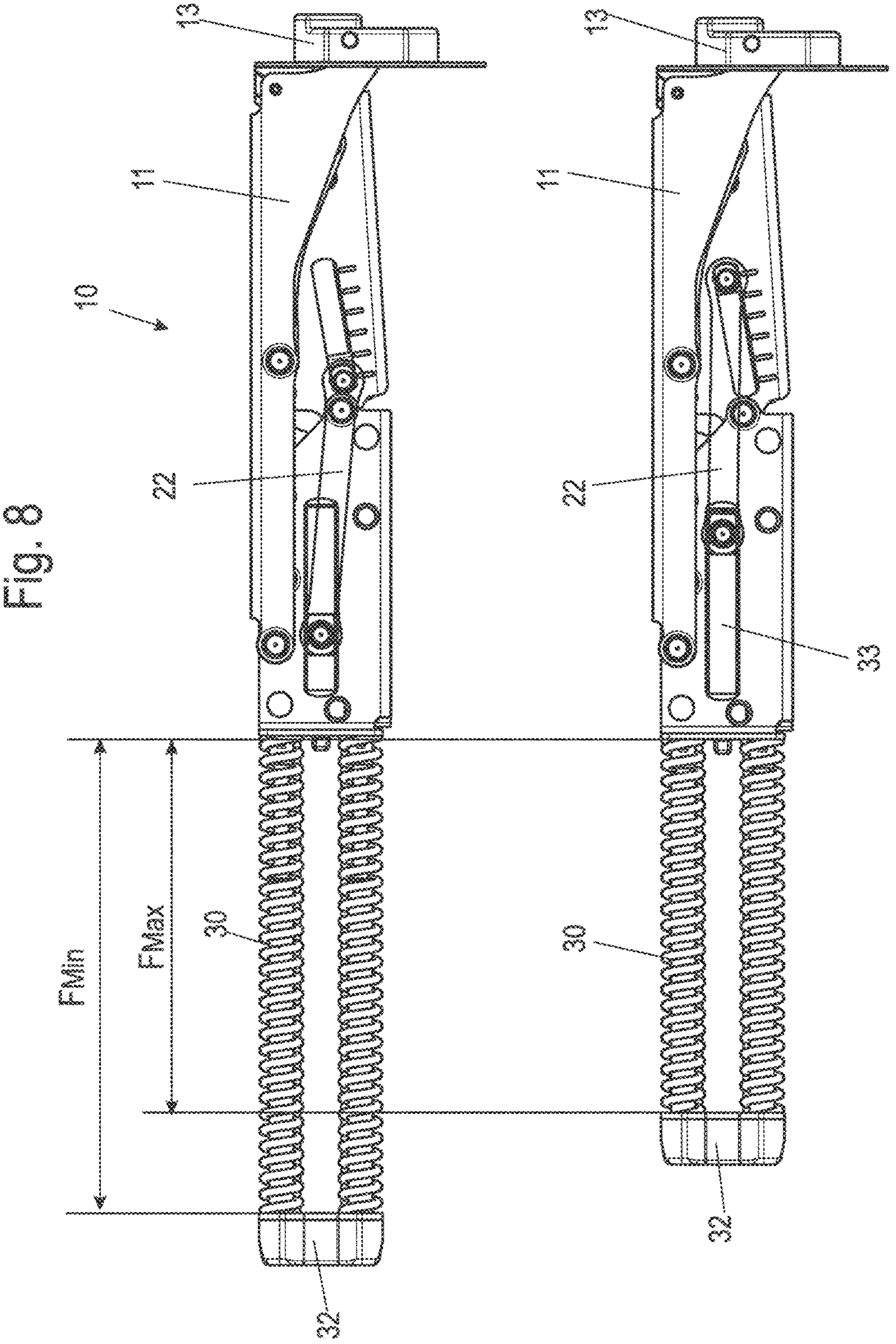
Figures 9A, 9B:
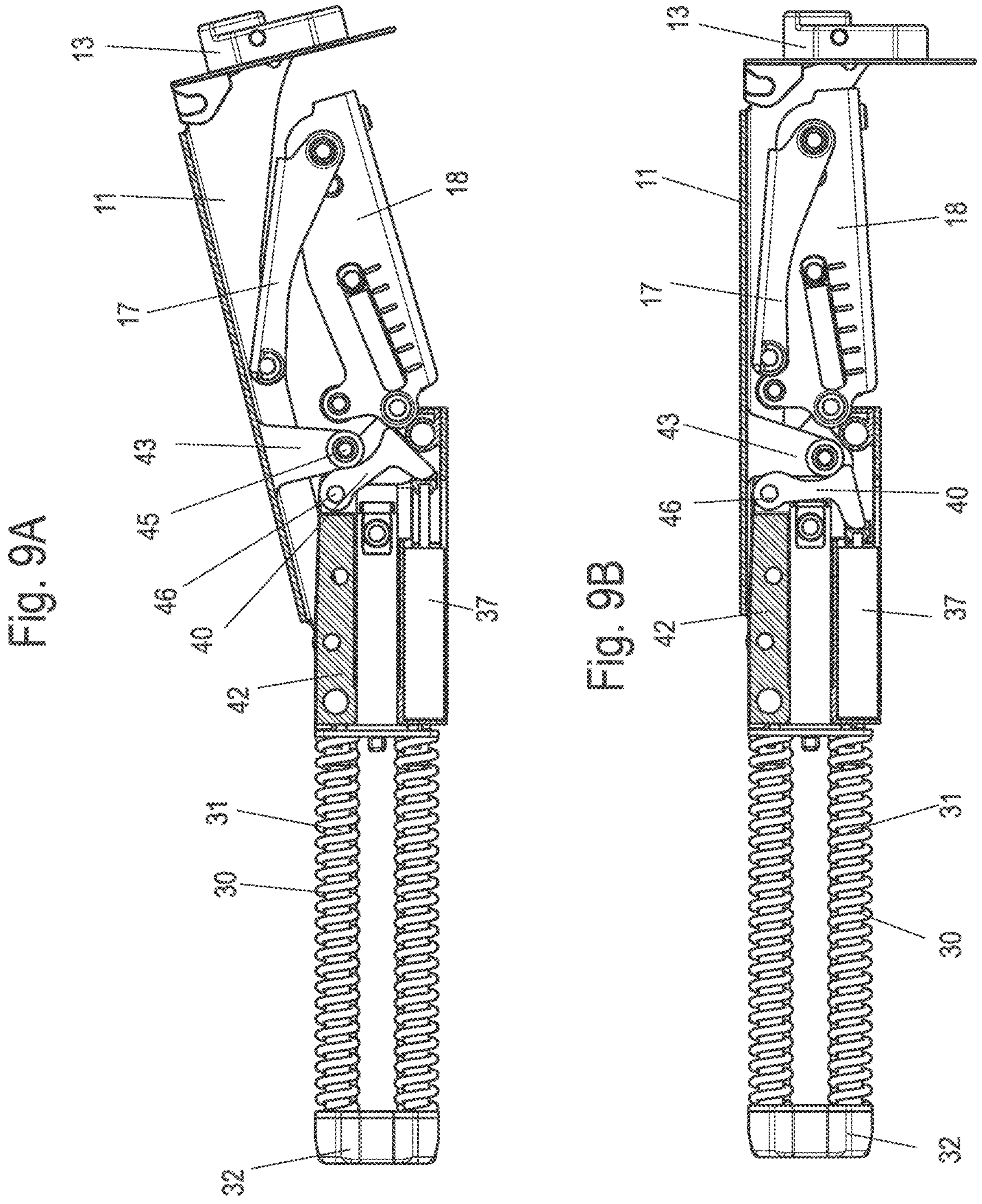
Figure 10A:
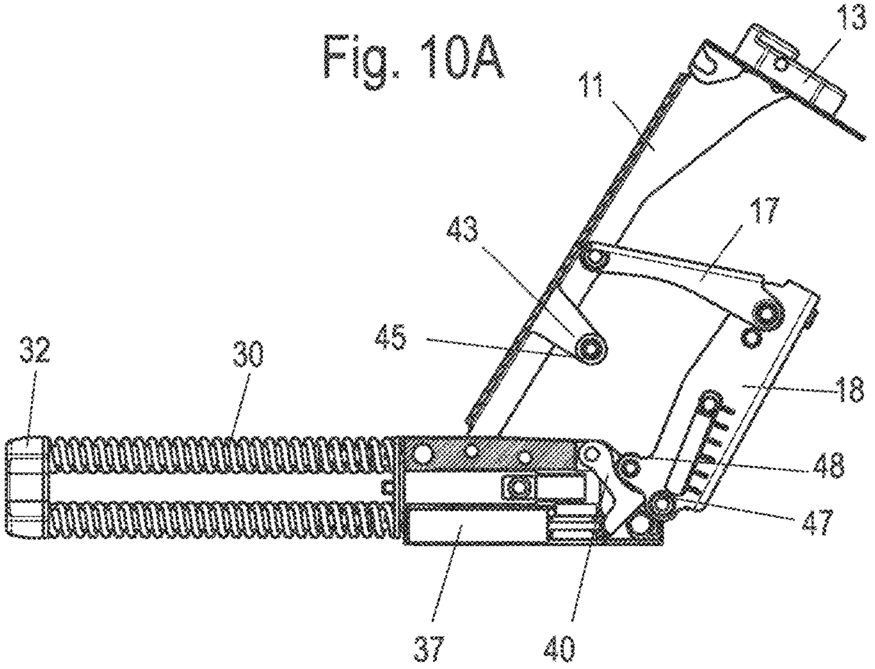
Figure 10B:
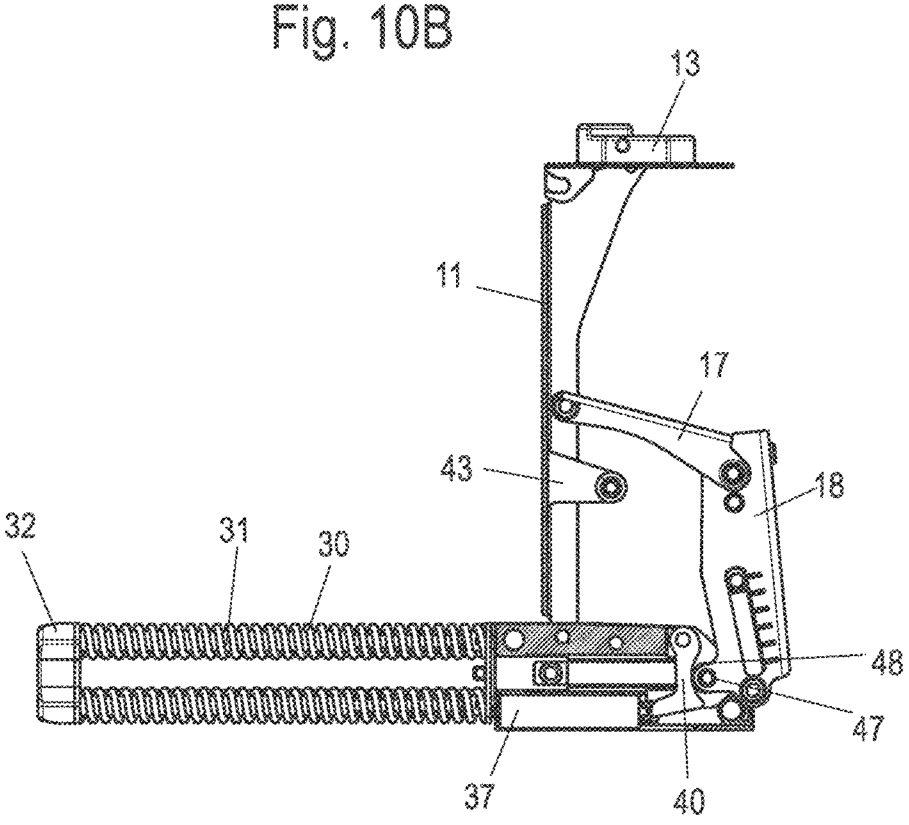
Figure 11C:
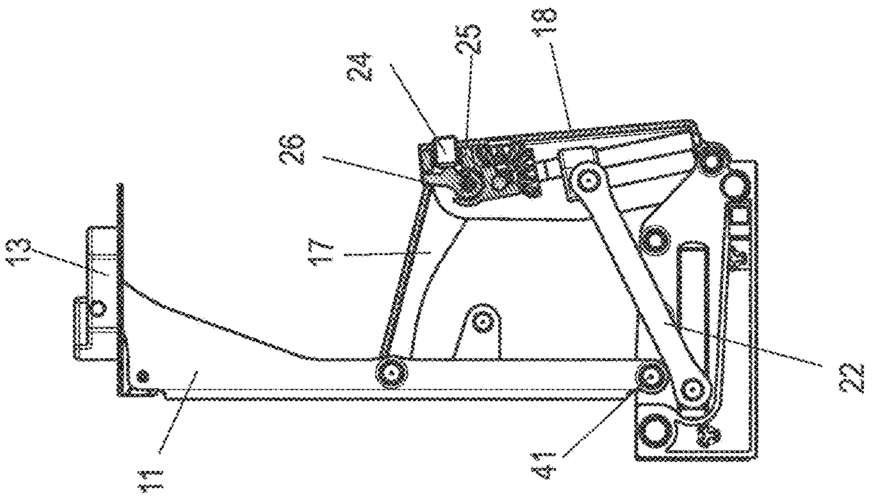
Figure 11B:
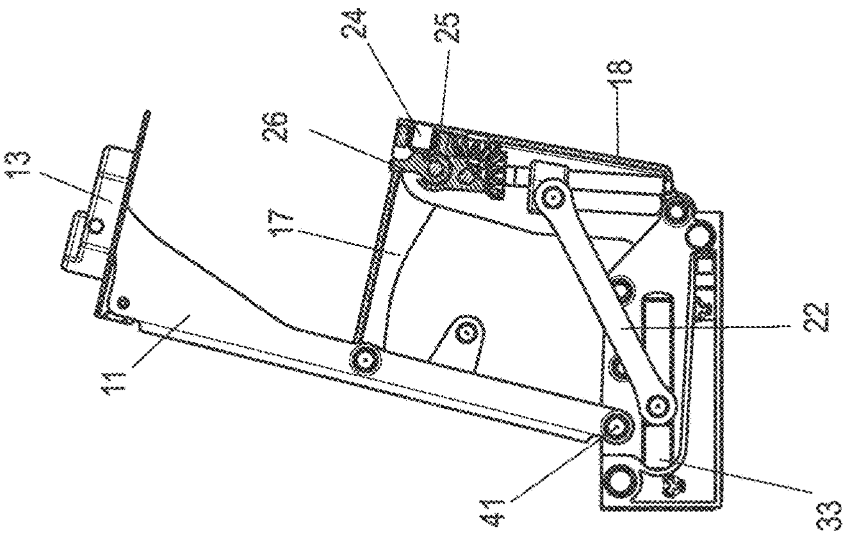
Figure 11A:
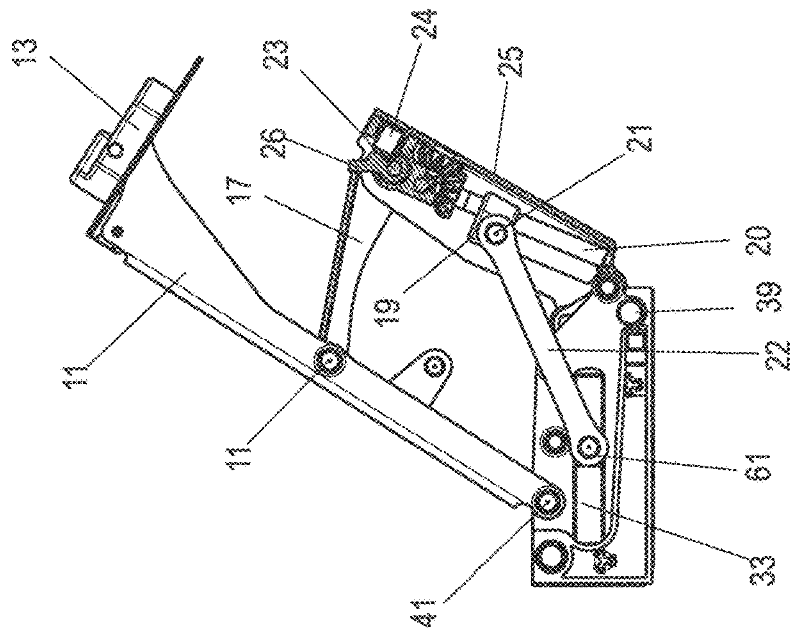
Figure 12:
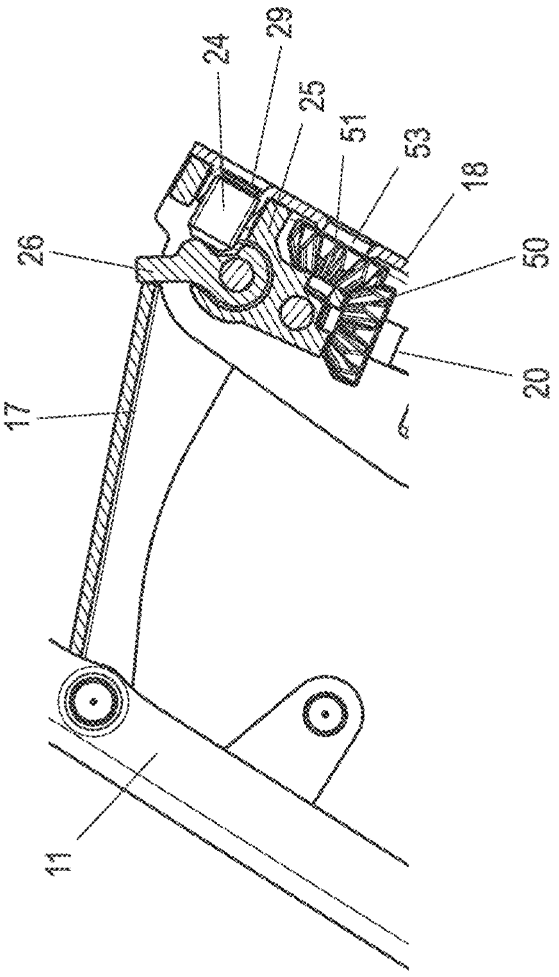
Figure 13A:
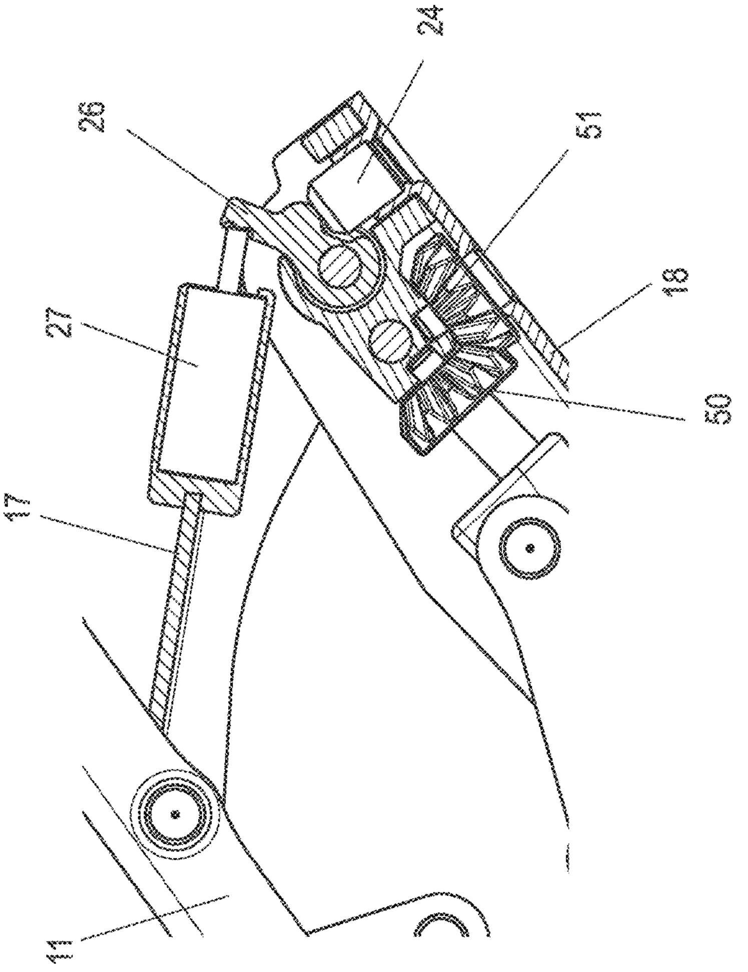
Figure 13B:
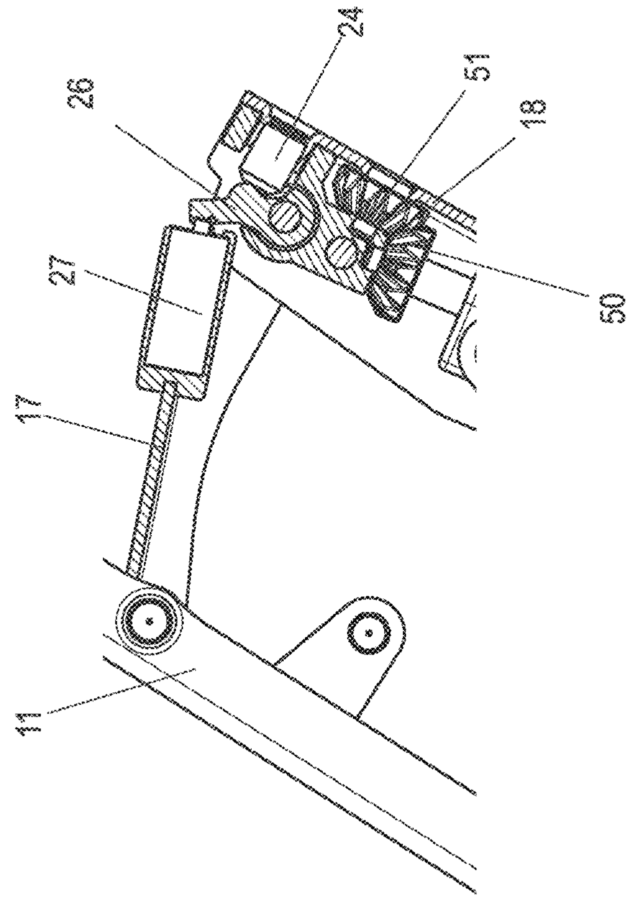
Figure 14:
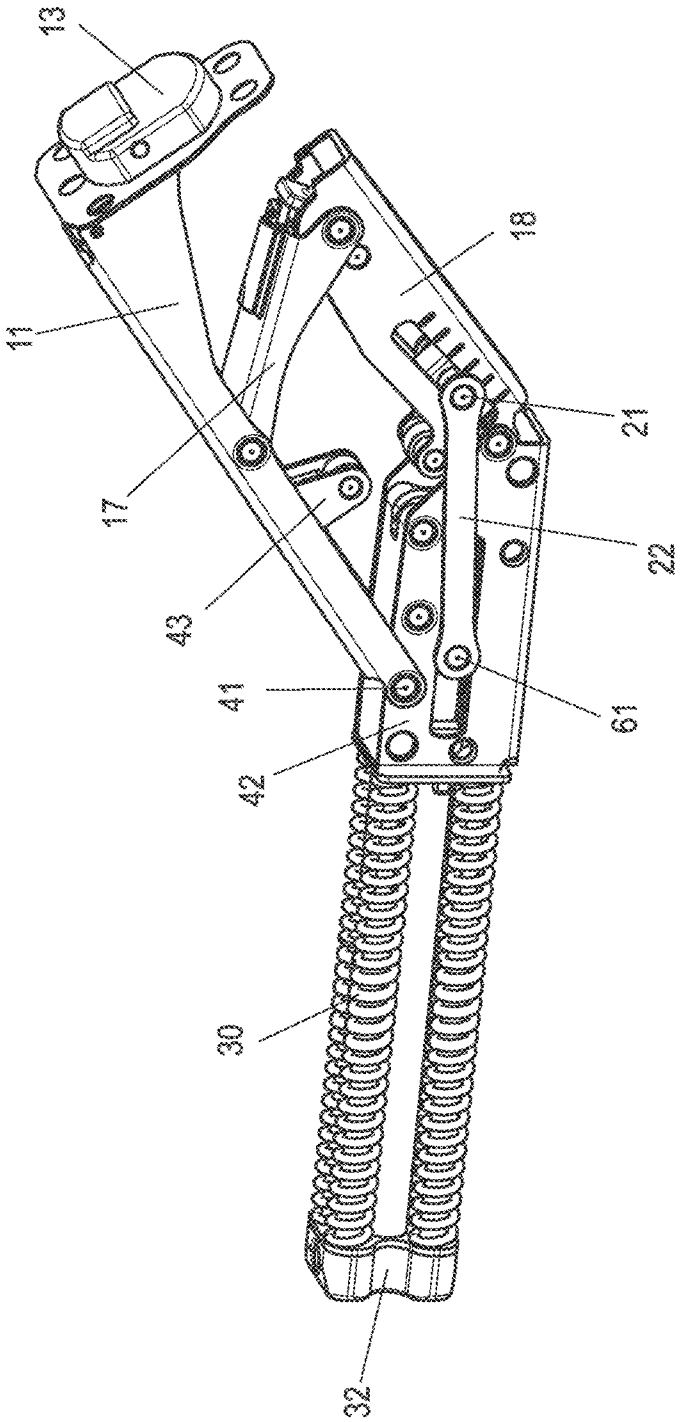
Figure 15A:
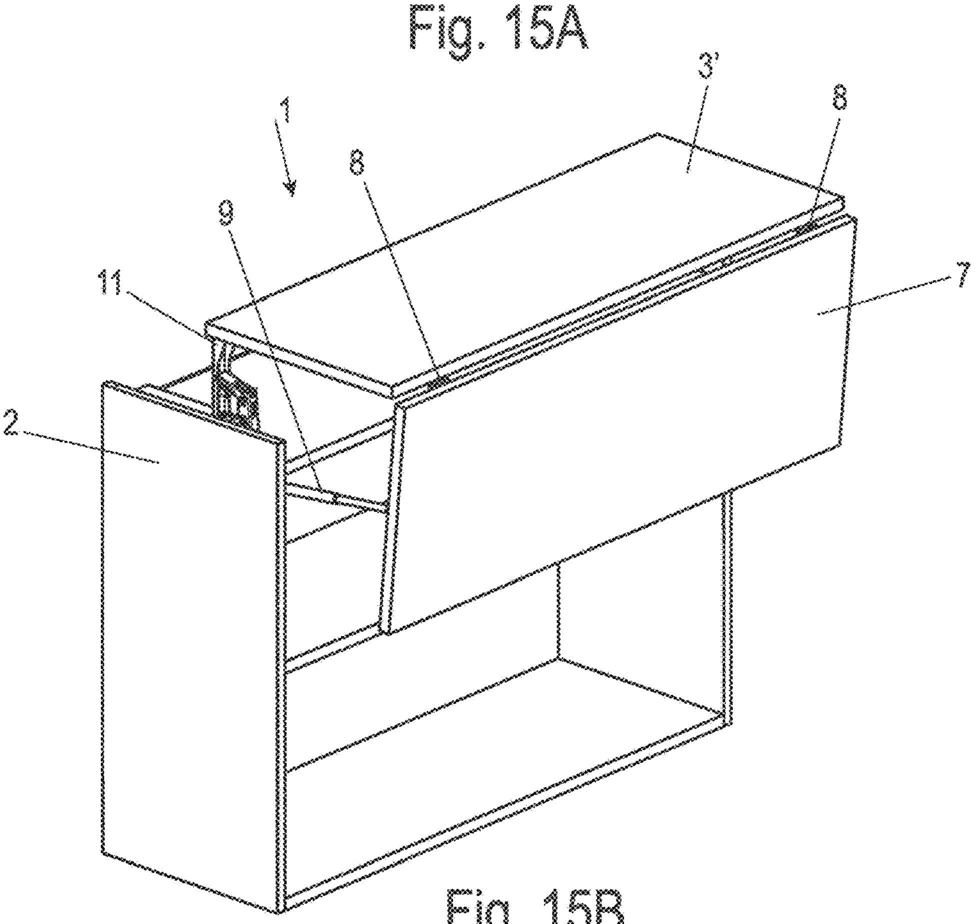
Figure 15B:
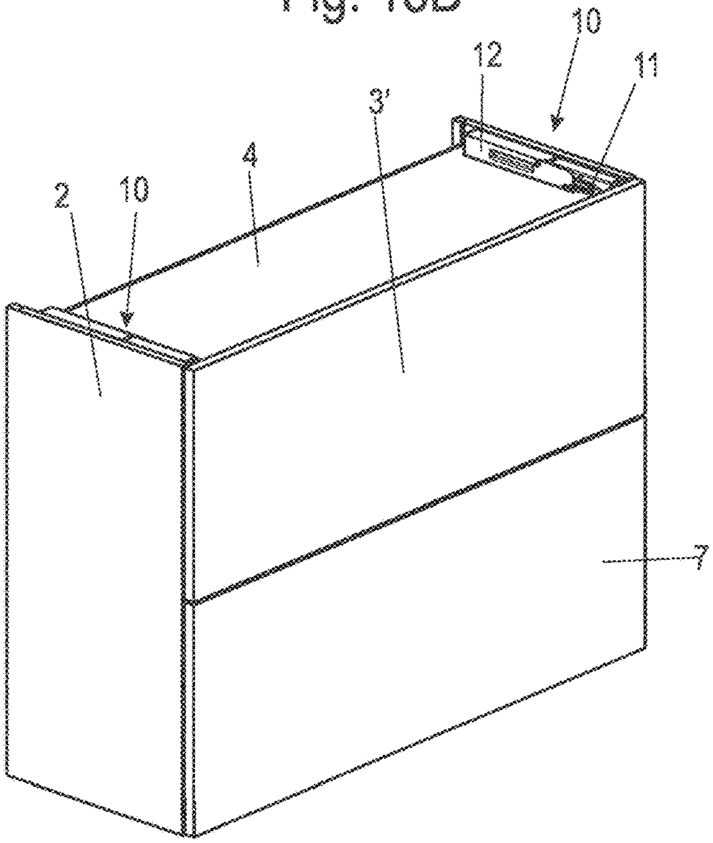
Figure 16B:
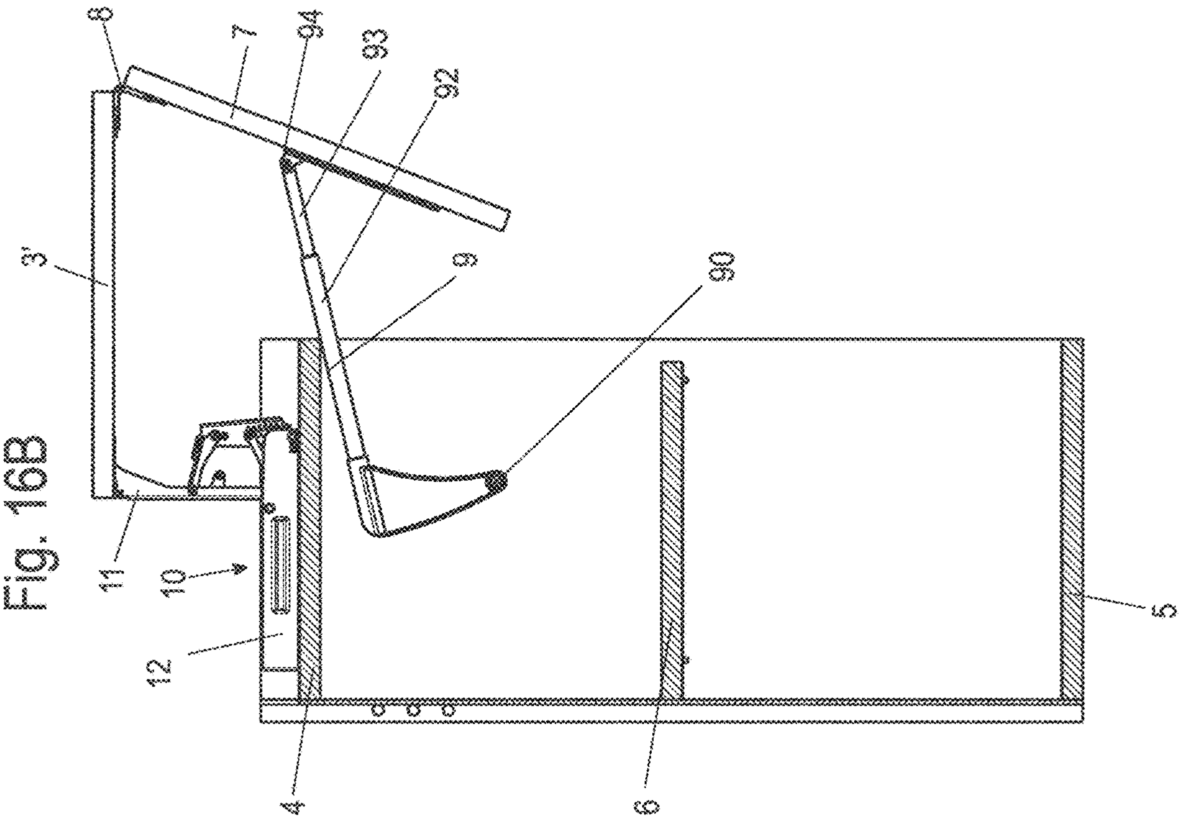
Figure 16A:
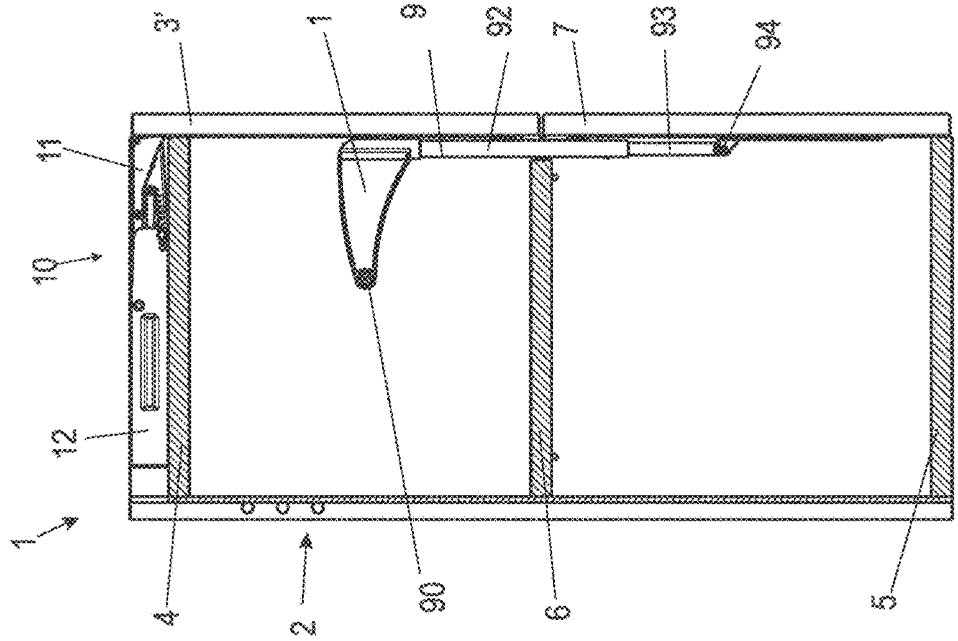

The invention is explained in more detail below with reference to several embodiments with reference to the accompanying drawings. It is shown in:

FIG. 1 a perspective view of a piece of furniture with a flap fitting;

FIG. 2 a perspective view of the piece of furniture in FIG. 1 with the flap open;

FIGS. 3A to 3C several sectional views of the piece of furniture in FIG. 1 in different positions;

FIG. 4 a view of the flap fitting without the piece of furniture;

FIG. 5 a view of the flap fitting of FIG. 4, partly in section;

FIG. 6 a view of the flap fitting of FIG. 4 in different positions to show a minimum working stroke;

FIG. 7 a view of the flap fitting of FIG. 4 in different positions to show a maximum working stroke;

FIG. 8 a view of the flap fitting of FIG. 4 with different spring bias,

FIGS. 9A and 9B two views of the flap fitting to show the closing damping;

FIGS. 10A and 10B two views of the flap fitting of FIG. 4 to show the opening damping;

FIGS. 11A to 11C several views of the flap fitting of FIG. 4 to show an opening limiter;

FIG. 12 a detailed view of the opening limiter;

FIGS. 13A and 13B two views of a modified opening limiter with a linear damper;

FIG. 14 a perspective view of the flap fitting in a middle opening position;

FIGS. 15A and 15B two views of a modified piece of furniture with a flap fitting according to the invention, and FIGS. 16A and 16B two sectional views of the piece of furniture of FIG. 15 in different positions.

A piece of furniture 1 includes a furniture body 2, on which a flap 3 is pivotably held via two flap fittings 10. The piece of furniture 1 can be formed as a wall unit or other piece of cabinet furniture. The flap 3 is essentially plate-shaped and is held pivotable via a support arm 11 of the flap fitting 10, as can be seen in FIG. 2. The flap fitting 10 is arranged on an upper floor 4 and positioned in a free space 70 between two side walls of the furniture body, with the side walls optionally projecting beyond the upper floor 4. In the open position of the flap 3, a storage space 80 is accessible from a front side of the furniture body 2.

As shown in FIGS. 3A and 3B, the furniture body 2 comprises a floor 5 and the upper floor 4, wherein optionally one or more shelf floors 6 can be arranged in the furniture body 2. On one top side of the upper floor 4, a flap fitting 10 is fixed on opposite sides, which includes a housing 12 on which a support arm 11 is rotatable about a horizontal axle 41. The side walls of the furniture body 2 project beyond the upper floor 4, so that the flap fitting 10 is not visible in the horizontal direction.

FIG. 3B shows a maximum open position of the flap fitting 10, where the flap 3 is arranged with a lower edge below the upper floor 4. The maximum opening position can be set via an adjustable opening limiter, as shown in FIG. 3C. The maximum opening position is now arranged so that the lower edge of the flap 3 is essentially on a horizontal plane with a bottom side of the upper floor 4.

FIG. 4 shows the flap fitting 10 without a piece of furniture. The flap fitting 10 includes the support arm 11 rotatably mounted on the housing 12 on a support element 42, to which a retaining element 13 is fixed at the free end, which serves to fasten the flap 3.

In FIG. 5, the flap fitting 10 is shown in a pivoted position of the support arm 11 and partially in section. A rotary catch 14 is rotatably mounted on the support arm 11 on the retaining element 13. The rotary catch 14 serves to lock the retaining element 13 to the support arm 11, in particular for tool-free assembly of the flap 3. When the flap 3 is assembled, the rotary catch 14 engages and fixes the retaining element 13 and the support arm 11 to each other. The rotary catch 14 is thereby pretensioned into an end position via a spring element 15 and is mounted on the support arm 11 about an axis of rotation 16, although optionally such a mounting can also be dispensed with and the retaining element 13 can be fixed firmly to the support arm 11 or formed integrally therewith.

In a central portion of the support arm 11, preferably in a range between 25% and 75% of the length of the support arm 11, there is an axle 44 to which a drive lever 17 is articulated. The drive lever 17 is articulated about an axle 23 in connection with a deflection lever 18. The deflection lever 18 is rotatable about an axle 39 on the housing 12. The support arm 11 is rotatably mounted on the housing 12 about an axle 41.

The flap fitting 10 includes an energy store 30 with at least one spring, in particular a coil spring, which is arranged between a support 35 on the housing 12 and a spring holder 32. The at least one spring or the springs of the energy store 30 are each arranged around a guide pin 31, which is telescopic and thus ensures axial alignment of the springs of the energy store. The springs of the energy store 30 are loaded in compression.

The spring holder 32 is connected via a pulling element 33, in particular a tension rod, to a pin 61, which forms a hinge axle for a lever 22. The lever 22 is thus articulated on one side to the pulling element 33 and articulated on the opposite side via a further axle 21 to a connection 19 in the shape of a carriage. The carriage includes a threaded bushing for a spindle 20, which is rotatably mounted on the deflection lever 18 or a component connected thereto. The spindle 20 is rotatable via a drive element in order to be able to adjust the connection 19 in the longitudinal direction of the spindle 20.

An adjustment element 24 for adjusting the position of an opening limiter 26, which is rotatable on an insert 25, is arranged on the deflection lever 18 adjacent to the axle 23. The opening limiter 26 can interact with a linear damper 27, which is held in a damper holder 28 on the drive lever 17. Alternatively, the linear damper 27 can also be provided on the deflection lever 18 and the opening limiter 26 on the drive lever 17. Optionally, the linear damper 27 can also be omitted.

A further damper 37 is arranged in the housing 12 and can be actuated via a damper guide 38, in particular by pressing a piston rod into a damper housing, which is biased into the extended position by a spring. The damper guide 38 can be moved via an actuating element 40.

A projection 43 with a roller 45 is arranged in a central portion on the support arm 11, which can be pressed against the actuating element 40 for closing damping.

In FIG. 6, the flap fitting 10 is shown in two different positions, namely once with the support arm 11 in a closing position and once in a maximum opening position, in which the support arm 11 has been pivoted by essentially 90°. As a result of the movement of the support arm 11, the drive lever 17, the deflection lever 18 and the lever 22 were also pivoted, so that the energy store 30 was able to relax slightly during the movement from the closing position to the maximum opening position, as shown by the working stroke $A_{min}$. Because of the small movement of the energy store 30, only a small force acts in the opening direction during the entire pivot path, which is advantageous for lightweight flaps 3. An effective lever length between the joint axis between the lever 22 and the deflection lever 18 and the effective direction of the energy store 30 is small. Optionally, a dead center can also be passed through when the support arm 11 is lowered, so that the energy store 30 ensures that the flap 3 is tightened against the furniture body 2.

FIG. 7 shows a modified adjustment in which the adjustment means with the rotatable spindle 20 has been adjusted so that the axle 21 for mounting the lever 22 is no longer arranged adjacent to the axle 39 of the deflection lever 18 on the housing 12, but rather in a central portion of the deflection lever 18. This increases the effective lever length and also results in the working stroke $A_{max}$ of the maximum stroke of the energy store 30 being significantly greater than in the adjustment shown in FIG. 6. Due to the pivoting arrangement of the lever 22 on the connection 19 and the energy store 30, the work length $S_{max}$ of the lever 22 is greater than the working stroke $A_{max}$ of the energy store 30. The further the connection 19 is from the axle 39, the greater the difference between the work length S and the working stroke A. In the range of the minimum working stroke $A_{min}$, it can be provided that the working length S is smaller than the working stroke A. In the range of the minimum working stroke $A_{min}$, it can therefore also be provided that the working length S corresponds to the working stroke A in one setting.

In FIG. 8, the flap fitting 10 is shown in the closing position, whereby different positions of the adjustment means are shown. In the upper illustration, the lever 22 has been moved via the adjustment means to a first end position in which the axle 21 is adjacent to the axle 39 of the deflection lever 18 so that the spring bias $F_{min}$ is as low as possible, as the springs of the energy store 30 have been relaxed by the adjustment. If, on the other hand, a stronger force is required when moving the support arm 11, the lever 22 is adjusted to the right via the adjustment means, at most up to a second end position, so that the springs of the energy store 30, which are designed in particular as compression springs, are compressed and exert a greater force $F_{max}$ on the spring holder 32. In the illustrated embodiment example, only one adjustment means is provided to adjust both the effective lever length of the lever 22 and the force of the energy store 30. It is also possible that a further adjustment device is provided on the spring holder 32 so that the position of the lever 22 on the deflection lever 18 can be adjusted separately from the spring force of the energy store 30, for example if the bias of the springs can be changed via an adjustment element on the spring holder 32.

FIGS. 9A and 9B show the closing damping of the support arm 11. In FIG. 9A, the support arm 11 is located shortly before the closing position, for example in an angle range between 10° and 40°. In this range, the roller 45 on the projection 43 reaches a curve guide on the actuating element 40, which is formed as a rotary lever and is rotatable about an axle 46 in the housing 12. If the support arm 11 is now moved further in the closing direction, the roller 45 presses against the curve guide on the actuating element 40, which presses against the damper 37 with one arm. The damper 37 is formed as a linear damper and includes a damping cylinder in which a piston with a piston rod is displaceable. Pressing in the piston rod brakes the actuating element 40 and thus also the support arm 11. A spring in the damper 37 automatically moves the piston rod into the extended position.

FIGS. 10A and 10B show an opening damping for the support arm 11, which is effected via the same damper 37 as for the closing damping. When the support arm 11 is moved in the opening direction, a roller 48 on a cantilever 47 of the deflection lever 18 comes into engagement with the actuating element 40, which has been moved back into the starting position due to the spring in the damper 37. If the support arm 11 is now moved further in the opening direction, as shown in FIG. 10B, the roller 48 on the cantilever 47 presses against the actuating element 40, which compresses the damper 37 and thus brakes the support arm 11 before reaching the maximum opening position.

FIGS. 11A to 11C show several views of the flap fitting 10, in which the support arm 11 is arranged in a maximum opening position in each case. The maximum opening position is predetermined by an opening limiter 26, which is formed as a rotatable stop and is adjustable via an adjustment element 24 in the shape of a grub screw. The adjustment element 24 can be adjusted on the insert 25.

FIG. 11A shows the maximum opening position of the support arm 11 with a short pivot path, and it can be seen that the opening limiter 26 has been adjusted counterclockwise by the adjustment element 24, so that the opening limiter 26 stops against a contact surface of the drive lever 17, which limits the pivot path of the support arm 11. If the adjustment element 24 is now adjusted on the insert 25, as shown in FIG. 11B, the opening limiter 26 rotates clockwise and thus enables further movement of the support arm 11 in the opening direction. In FIG. 11C, the adjustment element 24 has been rotated even further out of the insert 25 in order to adjust the opening limiter 26, which allows the support arm 11 to be opened by a wider swivel range. In the working range of the opening angle limiter, a variable adjustment of the stop is possible beyond the positions shown by way of example, so that any opening angle can be set.

FIG. 12 shows the adjustment element 24 with the opening limiter 26 in detail, which is rotatable about an axle on the insert 25. The opening limiter 26, which is designed as a lever, lies on one side on the adjustment element 24 and on the opposite side on a contact surface of the drive lever 17 in order to predetermine the end position when the support arm 11 is opened. In addition, the enlarged view shows the drive wheels 50 and 51, both of which are rotatably mounted on the insert 25. The drive wheel 50 is non-rotatably connected to the spindle 20. The drive wheel 51 is coupled to the drive wheel 50 via a gear mesh and can be rotated via a tool insert 53. In this arrangement, the tool insert 53 is arranged rotatable on the deflection lever 18.

FIGS. 13A and 13B show a modified embodiment compared to FIG. 11, in which the opening limiter 26 does not rest directly on a contact surface of the drive lever 17, but on a linear damper 27, which is fixed to the drive lever 17 via the damper mount 28, as is also shown in FIG. 5. In FIG. 13A, the opening limiter 26 is in contact with a piston rod of the linear damper 27, and the braking process of the support arm 11 begins. In FIG. 13B, the support arm 11 has reached the maximum opening position and the opening limiter 26 has pressed in the linear damper 27. During a closing movement, the linear damper 27 can extend the piston rod again, which is preloaded into the extended position via a spring. In this embodiment, the maximum opening position can also be adjusted via the adjustment element 24, which acts on the opening limiter 26.

In FIG. 14, the flap fitting 10 is shown in a central opening position, in which the drive lever 17 and the deflection lever 18 can be seen, which are formed U-shaped in cross section. The deflection lever 18 comprises an elongated hole in which the axle 21 is guided on the lever 22. The lever 22 includes two arms that embrace the deflection lever 18 and the housing 12. An elongated hole is also formed in the housing 12, in which a pin 61 of the lever 22 is guided.

FIGS. 15A and 15B show a modified piece of furniture 1' which includes a furniture body 2 on which a flap 3' is pivotably held via two flap fittings 10. The flap 3' is connected on the bottom side to a panel 7 via hinges 8, which are pivotable relative to the flap 3' when it is opened. The flap 3' and panel 7 form a foldable unit.

As shown in FIGS. 16A and 16B, the panel 7 is connected to the flap 3' via hinges 8, and a lever 9 is rotatably mounted in the furniture body 2 to guide the lower panel 7. The lever 9 is rotatable about an axle 90 on a side wall of the furniture body 2 and includes two lever parts 92 and 93, which are telescopic and are fixed to each other at the set length. The lever 9 can thus be adjusted in length and is fixed at the end to the panel 7 via a connection element 94. The flap fitting 10 can thus be used not only for one-piece flaps 3, but also for multi-piece foldable flaps 3', 7.

In the embodiment example shown, the position of the lever 22 can be adjusted via a spindle 20 which is rotatable on the deflection lever 18. Other adjustment mechanisms can also be used, for example linear guides or latching mechanisms, to lock one end of the lever 22 in the desired position on the deflection lever 18.

LIST OF REFERENCE SYMBOLS

1, 1' Furniture
2 Furniture body
3, 3' Flap
4 Upper floor
5 Floor
6 Shelf floor
7 Panel
8 Hinge
9 Lever
10 Flap fitting
11 Support arm
12 Housing
13 Retaining element
14 Rotary catch
15 Spring element
16 Axis of rotation
17 Drive lever
18 Deflection lever
19 Connection
20 Spindle
21 Axle
22 Lever
23 Axle
24 Adjustment element
25 Insert
26 Opening limiter
27 Linear damper
28 Damper receptable
29 Tool receptable
30 Energy store
31 Guide pin
32 Spring holder
33 Pulling element
35 Support
37 Damper
38 Damper guide
39 Axle
40 Actuating element
41 Axle
42 Support element
43 Projection
44 Axle
45 Roller
46 Axle
47 Cantilever
48 Roller
50 Drive wheel
51 Drive wheel
53 Tool insert
61 Axle
70 Free space
80 Storage space
90 Axle
92 Lever part
93 Lever part

94 Connecting element
$A_{min}$ Working stroke
$A_{max}$ Working stroke
$S_{min}$ Work length
$S_{max}$ Work length
$F_{min}$ Force
$F_{max}$ Force

The invention claimed is:

1. A piece of furniture comprising:

a furniture body with an upper floor (4), and a flap (3, 3'), at least one flap fitting (10) arranged above a top side of the upper floor (4) in order to hold the flap (3, 3') movably between a position closing a storage space (80) of the furniture body and an opening position, wherein the flap fitting (10) comprises a housing (12) on which a support arm (11) is rotatably mounted, the support arm comprising a retaining element (13) for fixing the flap (3, 3'), and an energy store (30) configured for applying a force to the support arm (11), the support arm (11) being articulatedly connected to a drive lever (17) which is articulatedly connected to a deflection lever (18) and an axle (23), wherein an opening limiter (26) is provided between the drive lever (17) and the deflection lever (18), the opening limiter being configured for adjusting a maximum opening position of the support arm (11), wherein the opening limiter (26) includes an adjustment element (24), which is adjustable relative to the drive lever (17) and the deflection lever (18), and interacts with a stop, wherein the adjustment element (24) is configured for adjusting the position of the opening limiter (26) and is rotatable on an insert (25), which is arranged on the deflection lever (18) adjacent to the axle (23).

2. The piece of furniture according to claim 1, wherein the opening limiter (26) and the stop move relative to a pivoting movement of the flap (3, 3') with respect to the pivoting support arm (10) and the flap (3, 3').

3. The piece of furniture according to claim 1, wherein the adjustment element (24) includes a threaded element which is held on a thread for stepless adjustment.

4. The piece of furniture according to claim 1, wherein the opening limiter (26) includes a rotatably mounted lever.

5. The piece of furniture according to claim 4, wherein the rotatably mounted lever of the opening limiter (26) is rotatable about an axle (23) about which the drive lever (17) and the deflection lever (18) are rotatably connected to one another.

6. The piece of furniture according to claim 1, wherein the stop comprises a linear damper (27), the linear damper being configured for braking the movement of the support arm (11) in the opening direction before a maximum opening position is reached.

7. The piece of furniture according to claim 6, wherein the opening limiter (26) comprises a tool receptable (29) for adjusting an opening angle of the flap (3, 3).

8. The piece of furniture according to claim 1, wherein the energy store (30) is connected to the deflection lever (18) via an adjustable connection (19), which is held on an adjustment means configured for adjusting a position of the connection (19) relative to the deflection lever (18).

9. The piece of furniture according to claim 8, wherein the adjustment means forms a unit with the deflection lever (18), which is articulatedly connected to the drive lever (17) and articulatedly connected to the housing (12).

10. The piece of furniture according to claim 1, wherein a damper (37) is provided, the damper being configured for braking a movement of the support arm (11) in the closing direction before reaching the closing position.

11. The piece of furniture according to claim 10, wherein the damper (37) is movable via an actuating element (40), via which a movement of the support arm (11) in the opening direction can be braked shortly before reaching the maximum opening position.

12. The piece of furniture according to claim 1, wherein the energy store (30) includes at least one spring and is held at one end on the housing (12) and at an opposite end on a spring holder (32), to which a pulling element (33) is fixed.

13. The piece of furniture according to claim 1, wherein a lower edge of the flap (3, 3') is arranged in a maximum opening position, at a smallest adjustable opening angle below a bottom side of the upper floor (4) and at a largest adjustable opening angle above the bottom side of the upper floor (4).

14. The piece of furniture according to claim 1, wherein the opening limiter is movable via a tool receptable (29) and the tool receptable (26) is only accessible in an open setting of the flap (3, 3').

* * * * *